US011520325B2

(12) United States Patent
Fortuny

(10) Patent No.: US 11,520,325 B2
(45) Date of Patent: Dec. 6, 2022

(54) METHOD FOR PREDICTING AN OPERATING ANOMALY OF ONE OR SEVERAL EQUIPMENT ITEMS OF AN ASSEMBLY

(71) Applicant: SOCIETE AIR FRANCE, Roissy-Charles-de-Gaulles (FR)

(72) Inventor: Didier Fortuny, Roissy-Charles-de-Gaulles (FR)

(73) Assignee: SOCIETE AIR FRANCE, Roissy-Charles-de-Gaulles (FR)

( * ) Notice: Subject to any disclaimer, the term of this patent is extended or adjusted under 35 U.S.C. 154(b) by 13 days.

(21) Appl. No.: 16/769,146

(22) PCT Filed: Nov. 29, 2018

(86) PCT No.: PCT/EP2018/082935
§ 371 (c)(1),
(2) Date: Jun. 2, 2020

(87) PCT Pub. No.: WO2019/110396
PCT Pub. Date: Jun. 13, 2019

(65) Prior Publication Data
US 2021/0232133 A1    Jul. 29, 2021

(30) Foreign Application Priority Data
Dec. 4, 2017  (FR) ...................................... 1761570

(51) Int. Cl.
*G05B 23/02*          (2006.01)
(52) U.S. Cl.
CPC ..... *G05B 23/0283* (2013.01); *G05B 23/0221* (2013.01); *G05B 23/0235* (2013.01); *G05B 23/0237* (2013.01); *G05B 23/0254* (2013.01)

(58) Field of Classification Search
CPC ............ G05B 23/0254; G05B 23/0283; G05B 23/024; G05B 23/0221; G05B 23/0235;
(Continued)

(56) References Cited

U.S. PATENT DOCUMENTS

| 9,664,725 B2 | 5/2017 | Amoussouga et al. |
| 2003/0065409 A1* | 4/2003 | Raeth ................. G05B 23/0254 700/31 |

(Continued)

FOREIGN PATENT DOCUMENTS

| AU | 2015249207 B2 | 2/2017 |
| FR | 2981474 A1 | 4/2013 |
| FR | 3016710 A1 | 7/2015 |
| FR | 3028331 A1 | 5/2016 |

OTHER PUBLICATIONS

Feb. 27, 2019 International Search Report issued in International Patent Application No. PCT/EP2018/082935.
Jun. 9, 2020 International Preliminary Report on Patentability issued in International Patent Application No. PCT/EP2018/082935.

*Primary Examiner* — Yoshihisa Ishizuka
*Assistant Examiner* — Carter W Ferrell
(74) *Attorney, Agent, or Firm* — Oliff PLC

(57) ABSTRACT

A method for predicting an operating anomaly comprises steps of (i) taking an assembly comprising at least a first and a second equipment item, each equipment item comprising a first operating parameter, (ii) recording and storing measurements over time of the first parameters for the first and the second equipment items, (iii) collecting the measurements during or after the completion of at least one part of an operating cycle, (iv) processing the collected measurements to detect a possible malfunction of the first and second equipment items by establishing a coefficient of determination, (v) emitting a first notification indicating the possible malfunction and/or triggering additional steps if the first coefficient of determination is less than a first threshold, and (Continued)

(vi) emitting a second notification and/or adjusting the first threshold if the first coefficient of determination is greater than or equal to the first threshold.

13 Claims, 3 Drawing Sheets

(58) Field of Classification Search
CPC ............... G05B 23/0237; G05B 17/02; G05B 23/0232; G05B 19/4184; G05B 23/0281; G05B 19/41875; G05B 2219/31357; G06N 20/00; G06N 3/0472; G06N 3/08; G06N 5/04; Y02P 90/02; G06F 17/18; G06F 11/008; G06F 11/079; B64D 2045/0085; B64F 5/60
See application file for complete search history.

(56) References Cited

U.S. PATENT DOCUMENTS

| | | |
|---|---|---|
| 2005/0197805 A1 | 9/2005 | Eryurek et al. |
| 2012/0016597 A1* | 1/2012 | Sutan ................. G01N 30/8665 702/24 |
| 2013/0197721 A1 | 8/2013 | Gu et al. |
| 2014/0285212 A1* | 9/2014 | Amoussouga ......... G01R 31/50 324/537 |
| 2016/0340059 A1 | 11/2016 | Pettre |
| 2018/0170580 A1 | 6/2018 | Gouby et al. |
| 2019/0130288 A1* | 5/2019 | Boggio ................ G07C 5/0808 |

* cited by examiner

METHOD FOR PREDICTING AN OPERATING ANOMALY OF ONE OR SEVERAL EQUIPMENT ITEMS OF AN ASSEMBLY

SUBJECT MATTER OF THE INVENTION

The present invention relates to a method for predicting the malfunction of one or several equipments of an assembly, the equipments operating in parallel and being meant to operate in the same way, the equipment(s) in particular being rotary machines, namely machines comprising at least one rotating mass.

BACKGROUND OF THE INVENTION

For many years now, the maintenance of equipments of industrial assemblies has been a major economic issue, whether it involves stationary facilities, such as production plants for manufactured products or energy production, or moving assemblies, for example in the transportation field, in particular airplanes, buses, locomotives or ships. Indeed, equipment maintenance is a substantial financial cost, due on the one hand to the maintenance actions strictly speaking, and on the other hand to the loss of exploitation represented by the necessary complete stoppage of the facilities or assemblies to which the equipment items belong, stoppages that are most often unforeseen and unanticipated.

Generally, equipment maintenance is said to be "curative" because it takes place only after a failure or malfunction of the equipment. Nevertheless, such maintenance has many organizational drawbacks in terms of mobilizing maintenance personnel, and the availability and procurement of spare parts, which negatively influences maintenance activities.

The maintenance of the equipment items can be "preventive", according to a fixed calendar or at determined operating intervals. It is regulatory, and therefore protective. It has a high cost, because an equipment that is operating normally can be replaced needlessly.

So-called "predictive" maintenance has then been proposed, so as to be able to anticipate the maintenance of the equipments and to plan it optimally so that it takes place at a time with the smallest possible negative impact on the operation of the industrial assemblies. However, this predictive maintenance requires identifying the failure, or the malfunction, well before it affects the equipment.

It has been proposed to monitor an equipment by performing tracking, generally in real time, of some of these operating parameters, the evolution of which over time reveals an operating deterioration of the equipment in question, and therefore the signs of an imminent failure.

For example, document AU 2015 249 207 describes, for a railroad locomotive, including several electric traction motors with three-phase alternating current, a method for predicting an imminent mechanical failure, a method that comprises transforming the intensity of the electrical signal, over time, of a motor, into frequency domains in order to form electric signatures, which are averaged in order to obtain signatures representative of the motors, which in turn are transformed through a root mean square error computation into a failure signature, used in order to determine the number of electric current failure measurements. For the motor that is being evaluated, a mean is calculated on the failure measurements of the motors with the exception of the evaluated motor, then compared to the mean of the failure measurements comprising the evaluated motor, and its failure or non-failure is identified by comparing this difference in means to a threshold.

However, such solutions are not satisfactory because they are not anticipatory enough to be fully beneficial, the defective equipment item being able to operate poorly for a long time before any defect is detected, the facility or the equipment comprising such an equipment item not operating optimally.

In order to improve failure anticipation, it has been proposed to monitor the correlation between different operating parameters. For example, for an industrial facility comprising various rotary equipment items, such as turbines or motors for implementing an industrial process, document US2005197805 describes the determination and tracking of a correlation coefficient of certain pairs of parameters of the industrial process, a correlation coefficient that is compared to that determined for normal conditions of the process, and if a difference is identified, a notification of imminent failure is generated.

Generally, the facilities or industrial assemblies comprise, and implement, many equipments, which may be different from or identical to one another, but some of which operate in parallel, in substantially the same manner. It has then been proposed to base the prediction of the occurrence of a failure on the tracking of the operation of two redundant equipments. For example, for an industrial facility for aluminum electrolysis, document FR 2,981,474 describes the monitoring of an operating parameter of a first apparatus correlated with another operating parameter of a second apparatus through a prediction of the values of the parameter of the first apparatus from the measured value of the second parameter of the second apparatus and their comparison with values actually measured of the parameter of the first apparatus, in order to detect a correlation error that is the sign of a future failure of the first apparatus.

Predictive methods have also been proposed in the aeronautical field, in which the occurrence of unforeseen failures, and their management, is more problematic in logistical terms, as well as in terms of costs, especially if the failures occur on distant platforms.

For example, document US 2013197721 describes a method for generating particular messages related to the performance of an aircraft implementing an identification of the main operating parameters of the aircraft, those which have a high level of correlation, between 0.6 and 0.8, and next a correlation calculation between the change of value of these main parameters and a parameter indicating a failure event.

Document FR 3 028 331 describes the monitoring of an aircraft engine, for the planning of maintenance operations, which implements a normalization of the endogenous operating parameters of the engine while taking account of an endogenous parameter of the engine and at least one exogenous parameter specific to the usage environment of the engine, thus making it possible to compare the data coming from successive flights.

Document FR 3 016 710 describes a method for predicting an operating anomaly of the equipments of an aircraft in which, during maintenance phases of the aircraft, the operating measurements and the failures are recovered on a computer in order to form a database, and during the maintenance phase, a data analysis program is run in order to determine, in the absence of a failure, a set of pairs of parameters that correlate all of the available parameters with one another, and still during the maintenance phase, a computer program is run in order to calculate Pearson correlations for the pairs of parameters that correlate with one another and, when the calculated correlation value of a pair, for a given flight, falls below a predetermined detection threshold, a malfunction is signaled. This method has many drawbacks. First, in order to automatically determine the parameters that correlate with one another, it is necessary to collect all of the measurements from all of the sensors of all of the equipments of the aircraft, thus creating a tremendous volume of data that is difficult to process. Additionally, this method is not sensitive enough, not fine enough in the prediction of any failures, since it has a high false alarm or false failure declaration rate, causing needless replacements of equipments without malfunctions.

Aims of the Invention

The present invention aims to provide a solution, in particular a method for predicting a failure of one or several equipments of an assembly that does not have the drawbacks of the state of the art.

The present invention aims to provide a method for predicting a failure of one or several equipments of an assembly that is more sensitive, more reliable, and therefore has an improved performance.

The present invention aims to provide a method for predicting a failure of one or several equipments of an assembly that has a reduced rate of false failure declarations.

BRIEF DESCRIPTION OF THE INVENTION

The present invention relates to a method for predicting an operating anomaly of one or several equipments of an assembly, comprising the steps of taking an assembly, having at least one operating cycle, and comprising one or several series of equipments comprising at least a first and a second equipment both operating in parallel and in substantially the same manner, each equipment comprising a first operating parameter or at least a first, a second and a third operating parameter, each parameter evolving, over time, in a similar manner between the first and the second equipments, recording and storing measurements over time of the first or of the parameters for the first and the second equipments, for one or several operating cycles, or one or several parts of the cycle(s), collecting the measurements during or after the completion of one or several operating cycles, or one or several parts of the cycle(s), processing the collected measurements, in order to detect a possible malfunction of the first and/or second equipments, by establishing a first coefficient of determination, between the measurements of the first parameters of the first equipment and the measurements of the first parameters of the second equipment, if, for one or several operating cycles, or one or several parts of the cycle(s), the first coefficient of determination is below a first determined threshold, emitting a notification indicating the malfunction of the first and second equipment(s) and/or triggering additional steps of the method according to the invention and, preferably, if the first coefficient of determination is greater than or equal to the first threshold, emitting a notification indicating an absence of malfunction of the first and/or second equipment item(s) and/or adjusting the first threshold as a function of the first coefficient of determination.

According to preferred embodiments of the invention, the method according to the invention comprises at least one, or any suitable combination, of the following features:

the method further comprises the prior selection of the one or more series of first and second equipments of the assembly and/or of the first operating parameter of the first or second equipment, the method further comprises the steps of determining the equation of the linear regression between the first operating parameter of the first equipment and the first operating parameter of the second equipment for one or several operating cycles, or one or several parts of the cycle(s), and determining the absolute value of the constant of said equation, if the absolute value is less than or equal to a determined value, establishing, for the first and/or the second equipments, for one or several operating cycles, or one or several parts of the cycle(s), a second coefficient of determination between the first operating parameter and a second operating parameter, and a third coefficient of determination between the first operating parameter and a third operating parameter, and if the second and third coefficients of determination are respectively greater than or equal to a second and third threshold, emitting a notification indicating an absence of malfunction and/or adjusting the second and third thresholds as a function of the second and third coefficients of determination, if the absolute value is greater than the determined value, evaluating the operating noise of the first and/or second equipment, if the noise is greater than a determined range of values, emitting a malfunction notification of the equipment(s), if the noise is comprised in the determined range, without the presence of value peaks of the first operating parameter, emitting a notification indicating an absence of malfunction and/or adjusting the determined range of values for the operating noise, if the noise is comprised in a determined value range, in the presence of value peaks of the first operating parameter, emitting a notification indicating a malfunction of the equipment(s), the step of determining operating noise of the first and/or second equipment is done by determining the standard deviations of the measurements of the first operating parameter relative to the mean of the measurements over one or several operating cycles, or one or several parts of the operating cycle(s), by comparing the standard deviations to a determined range of limit mean values, the second and the third parameter are chosen among other operating parameters of the first and the second equipments, different from the first operating parameter, one or several parameters directly influencing the operation of the first and/or the second equipment, one or several operating parameters of one or several other equipments of the assembly or a combination thereof, the first threshold of the first coefficient of determination is determined during one or several operating cycles of the assembly, or the part(s) of the cycle(s), wherein no malfunction of the first and/or second equipment has been detected, the second threshold of the second coefficient of determination and/or the third threshold of the third coefficient of determination and/or the absolute value of the constant of the equation of the linear regression, is or are determined during one or several operating cycles of the assembly, or one or several parts of the cycle(s), in which no malfunction of the first and/or the second equipment has been detected, the determined range of limit mean values of the standard deviations of the measurements of the first parameter is determined during one or several operating cycles of the assembly, or one or several parts of the cycle(s), wherein no malfunction of the first and/or the second equipment has been detected, the method further comprises one or several graphic representations as a function of the operating cycle(s), or parts of the cycle(s), of the measurements of the first operating parameter of the first and/or the second equipments and/or the first coefficient of determination, or said first operating parameter, of said first coefficient of determination and the second and/or third parameters and/or the first and/or second and/or third coefficients of determination and/or value peaks in the measurements of the first parameter, the assembly is selected from an aircraft, a car, a bus, a truck, a locomotive, a boat, a ship or a spacecraft, which may or may not be autonomous, and the first and the second equipment item are rotary machines, the assembly is an aircraft, the first and the second equipments are fuel booster pumps of one or several engines and the first operating parameter of the fuel booster pumps is the electric current consumed by each fuel booster pump, the second parameter is the mean quantity of fuel measured on the surge tank, and the third parameter is the mean quantity of fuel measured in the main tank.

The present invention also relates to a maintenance method of an assembly, comprising one or several series of equipments comprising at least a first and a second equipment both operating in parallel and substantially in the same manner, implementing the method according to the invention.

DETAILED DESCRIPTION OF THE INVENTION

Figure 1:
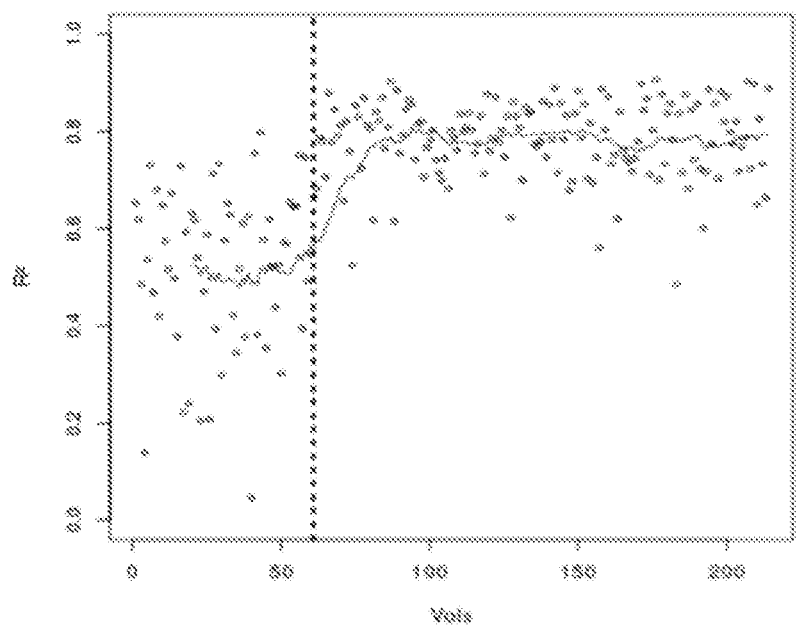
FIG. 1 is a graph showing the evolution of the coefficient of determination established for a first operating parameter of two redundant equipment items as a function of the number of operating cycles, before and after replacement of the defective equipment, for a specific embodiment of the invention in which the assembly is an aircraft, the operating cycles are flights of the aircraft, and wherein the first parameter is the intensity of the electric current consumed by two fuel booster pumps.

The method according to the invention is a method for predicting an operating anomaly, or a failure, of one or several equipments of an assembly, which require maintenance, or which offers improved performance levels, or greater longevity, once this maintenance is done, the assembly comprising one or several series of equipments, each series comprising at least two equipments, called redundant because they operate in parallel, substantially in the same manner, and each having at least a first operating parameter that evolves, over time, in a similar manner between the two equipments during their operation.

Preferably, the first operating parameter that is monitored over time is at least of the same type for the two equipments; advantageously, it is the same operating parameter, for example the electrical consumption value of each equipment item.

The equipments in question may be any data processing system or machines, irrespective of their nature, whether mechanical and/or electrical and/or chemical and/or electronic, and their degree of complexity, preferably rotary machines, equipments operating continuously and/or intermittently and able to be implemented in many technical fields, for example for the manufacture or transformation of products, energy production or transportation.

Preferably, the assembly may be part of a more complex industrial system.

Preferably, the assembly in question in the present invention is used for electricity, oil or gas production.

In one particular embodiment of the invention, the assembly is implemented for electricity production and the at least two equipment items are gas turbines.

Without being limiting, the invention will be described for another embodiment, in the transportation field, in which the assembly is an aircraft, for example an airplane or a drone, and the equipments are fuel booster pumps of the engines, the first operating parameter being the electrical current consumed by each booster pump; nevertheless, the equipments in question may be other embedded devices of the aircraft, preferably other rotary machines, other than fuel pumps. However, the method may be implemented more generally in the transportation field, for example cars, buses or trucks, locomotives, ships or spacecraft, but also in the field of robotics, for example autonomous robots.

The method comprises a first step of recording and storing measurements, over time, and therefore over the evolution, of one or several operating parameters of the redundant equipments whereof a failure may be predicted, the parameter(s) being meant to evolve over time substantially in the same manner for each equipment. Preferably, in addition to the parameter(s) of the redundant equipments, a recording and storage of the measurements, over time, is done for one or several other parameters, optionally operating parameters of other equipments or devices of the assembly, which are preferably also redundant with respect to one another, and which are preferably directly related to the operation of the two monitored redundant equipments. For example, for fuel booster pumps of engines of an aircraft, the quantity of kerosene in a surge tank and the quantity of kerosene in the overall tank can also be measured, recorded and stored for subsequent processing.

The recording and storage of the measurements, irrespective of the operating parameter in question, can be done by the equipments themselves or by a device of the assembly in question, or by a device, or by a system, outside the assembly in question.

Preferably, the method comprises a step of collecting data corresponding to the measurements of the parameter(s). This collection can be done on, and using, a device or system separate and remote from the assembly in question, and can be done either after the completion of several operating cycles of the assembly in question, or at the end of a single operating cycle, or continuously over time, preferably after a period of time that corresponds to one or several parts of an operating cycle of the assembly in question.

"Operating cycle" refers to the period of time during which the assembly in question, and therefore the equipments of the assembly, is or are operating, therefore in the working state. This is therefore the period of time separating the start from the stop of the assembly in question or of these considered equipments. The parts of an operating cycle are periods of time comprised in the operating period of the equipments. These parts of the cycle can be periods during which the equipments operate in the same manner with respect to one another, or in the same manner with respect to one another and differently relative to another part of their operating cycle.

For example, for an aircraft, and if it is considered that an operating cycle is a flight from a departure airport to a destination airport, the continuous recording and the storage of the parameter(s) of the two equipments is done from the starting of the equipments to their stopping, and/or for cycle parts, that is to say, the different flight phases, taxi, takeoff, ascent, cruising, descent, the landing phase, and taxi to the parking area. This recording and storage are done from a flight data recorder or an aircraft condition monitoring system, called ACMS, which generates reports called snapshots or larger files called SAR, for Smart ACMS Recorder, representing values of the parameter(s) over time. The reports can be communicated during the flight via the air/ground communication system or ACARS (for Aircraft Communication Addressing And Reporting System), during determined time intervals, the SARs being able to be communicated after the flight, or after a series of several successive flights, to a third-party device or system that collects them for processing.

It is especially advantageous for the method according to the invention to comprise a prior step of selection of the redundant equipments to be monitored, and optionally also the operating parameters to be tracked. Preferably, the method tracks at least one operating parameter of at least two determined redundant equipments, which are therefore identical and operate in parallel, and optionally also one or several other operating parameters of one or several devices or equipment items of the assembly whose operation is directly related to the operation of the two redundant equipments. This has the advantage of only collecting the data corresponding to the determined parameter(s) for determined equipments, without having to collect, then select and process all of the data, all of the operating parameters of all of the equipments of the assembly in question, especially if it involves an aircraft.

The method according to the invention further comprises a step of processing the collected data.

For a first operating cycle of the assembly in question, or time intervals in a first operating cycle, for example for an aircraft, a flight or the different flight phases, a linear regression is established between the values, over time, of the first operating parameter of the first equipment and those of the same operating parameter of the second equipment. Indeed, the two equipments operating in parallel, and being meant to do so substantially identically over time, a linear relationship therefore exists between the values of this first parameter that were measured for the two redundant equipments.

A first coefficient of determination is then computed for the first operating cycle, or part of the first operating cycle.

Contrary to a coefficient of correlation, which makes it possible to determine the intensity of the connection that may exist between two values, the coefficient of determination, which, for a linear regression, is the square of the coefficient of correlation, has the advantage of saying at what point the determined regression coefficient is suitable for describing the distribution of the values of the measurements. Additionally, as regards a coefficient of correlation, this latter can only be used for series of switchable values, that is to say, values of a first series of measurements of a first equipment that can be swapped with those of a second series of values of a second equipment, whereas the coefficient of determination makes it possible to identify the relationship existing between values, whether the latter can or cannot be switched between two series of measurements, the measurements of one equipment being connected to those of the other equipment, without being able to be switched.

Thus, a coefficient of determination of "1" then means that the equation of the regression line is capable of determining 100% of the distribution of the values, signifying a strong prediction power, whereas a coefficient of determination of "0" means that the regression line absolutely does not explain the distribution of the values and that the values are very dispersed, which is the sign of a low prediction power.

Next, a multitude of linear regressions are established and a multitude of coefficient of determinations are computed, between the values, over time, of the first operating parameter of the first equipment and those of the same operating parameter of the second equipment, for other operating cycles, or time intervals of other operating cycles, which can be before and/or after the first operating cycle, in order to establish a collection of values for the first coefficient of determination on a multitude of cycles or parts of a multitude of cycles.

Preferably, the number of operating cycles taken into consideration is between two and two hundred or more, advantageously it is around forty cycles, a number that represents a good compromise between quantity of measurements to be processed and reliability of the method according to the invention.

In the present invention, for a given operating cycle, or for a series of operating cycles, if a value, preferably several values of the first coefficient of determination is/are equal or located above a first determined threshold, between this first threshold and the value of "1", this means that the values measured for the first parameters of the first equipment are close to those measured for the second equipment and that therefore the two equipments are operating in parallel in a symmetrical or substantially symmetrical manner. Conversely, if a value, preferably several values of the first coefficient of determination are below a first determined threshold, then the two redundant equipments do not work symmetrically. Consequently, a first notification may be emitted to indicate the malfunction or proper working of the equipment(s) and to trigger, or not trigger, a request for inspection, maintenance or replacement of the redundant equipments, or, and preferably, to trigger additional steps in order to refine the method according to the invention.

This first determined threshold is a function of the redundant equipments that are tracked. It is preferably established based on one or several operating cycles in which neither of the two redundant equipments have experienced a malfunction or a failure. Preferably, this first determined threshold is updated continuously, as a function of the first coefficients of determination established for operating cycles without failures.

In the example of measurements of the electric current consumed by fuel booster pumps of the engines of an aircraft, a first coefficient of determination equal to, or between 0.6 and 1, preferably between 0.65 and 0.7, means that the fuel booster pumps are working symmetrically or substantially symmetrically, whereas a first threshold below 0.6 means that the pumps are working asymmetrically (FIG. 1).

In order to reduce, or even eliminate false alarms or false failure declarations, the method according to the invention comprises one or several additional steps, the implementation of which is preferably done by the malfunction of one or both equipments, preferably following the sending of the notification reporting this malfunction.

Preferably, the method implements a step for evaluating the constant "b" of the equation of the linear regression line, of the type $Y=aX+b$, which is determined for the first operating parameter of the first equipment and that of the second equipment, for an operating cycle, or part of this cycle, preferably also for other operating cycles, or parts of operating cycles.

Figure 2:
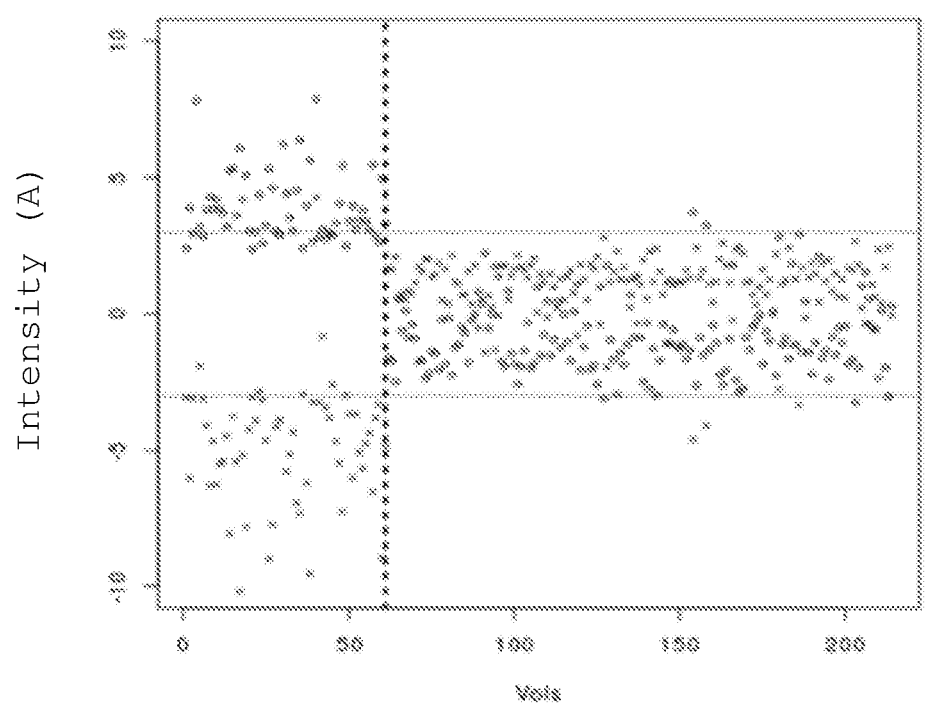
FIG. 2 is a graph showing the evolution, as a function of the number of operating cycles, of the value of the constant of the equation of the regression, established for a multitude of operating cycles, between the first operating parameter of the first equipment and the first operating parameter of the second equipment, before and after replacement of the defective equipment, for the specific embodiment of the invention in which the assembly, comprising the redundant equipments, is an aircraft, the operating cycles are flights, and wherein the first parameter is the intensity of the electric current consumed by two fuel booster pumps.

The absolute value of the constant "b" of this or these equations of the regression makes it possible to estimate the deviation between the first operating parameter of the two redundant equipments and therefore to estimate the deviation with which the two redundant equipments are operating. If the value "b" is greater than or equal to a determined value, a threshold that is a function of the tracked redundant equipments, this means that one of the two considered equipments no longer has a linear operation, in an operating cycle, or operating cycle part, or between different operating cycles (FIG. 2). In this case, a second and third coefficients of determination are calculated and/or evaluated for one of the equipments, preferably both redundant equipments, in order to identify which of the two equipment items is not operating normally.

Preferably, this determined value of "b" is also established based on one or several operating cycles in which neither of the two redundant equipments have experienced a malfunction or a failure. Preferably, this determined value is updated continuously, as a function of the values of constant "b" established for operating cycles without failure, and makes it possible to adjust this determined value serving as threshold.

A second coefficient of determination is calculated for an operating cycle, or time intervals of said cycle, preferably a multitude of operating cycles, or time intervals of said cycles, that is or are the cycle(s) or cycle part(s), during which the first coefficient of determination was done. This coefficient of determination is calculated between the first parameter of one of the two redundant devices and a second parameter that is either another operating parameter of the device in question, different from the first operating parameter, or a parameter that directly influences the operation of the evaluated equipment or an operating parameter of one or several other equipments or devices of the assembly, which are preferably directly related to the operation of the evaluated redundant equipment.

A third coefficient of determination is calculated for an operating cycle, or time intervals of said cycles, preferably a multitude of operating cycles, or time intervals of said cycles, between the first parameter of one of the two redundant devices and a third parameter that can be one or several other operating parameters of the device in question, a parameter, preferably several parameters, different from the first and the second operating parameter, or a parameter that directly affects the operation of the evaluated equipment, or an operating parameter of one or several other equipments or devices of the assembly that are directly related to the operation of the evaluated redundant equipment.

Preferably, the second and third parameters are different from one another.

If the second coefficient of determination is greater than or equal to a second threshold, which is a function of the first operating parameter of the equipment and the second considered parameter, and the third coefficient of determination is greater than or equal to a third threshold, which is a function of the first operating parameter of the equipment and the third considered parameter, this means that the evaluated equipment is operating normally. Otherwise, the evaluated equipment is suffering from a malfunction and a notification is emitted to report it and so that an inspection, maintenance or a replacement is done.

The second and third threshold are determined based on one or several operating cycles in which neither of the two redundant equipments have experienced a malfunction or a failure. Preferably, these second and third thresholds are updated continuously.

Figure 3:
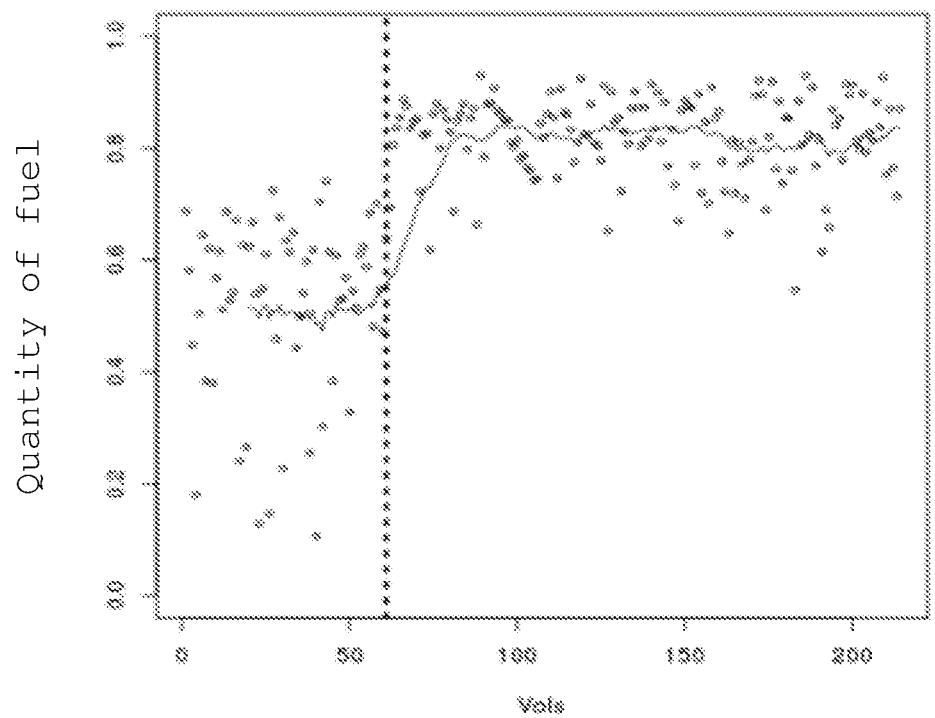
FIG. 3 is a graph showing the evolution, as a function of the number of operating cycles, of the second coefficient of determination established between the first operating parameter of one of the two redundant equipments and a second parameter influencing the operation of the equipment, before and after replacement of the equipment, for the specific embodiment of several flights of an aircraft, the first parameter being the electric current consumed by a fuel booster pump, the second being the mean quantity of fuel measured on the surge tank.
Figure 4:
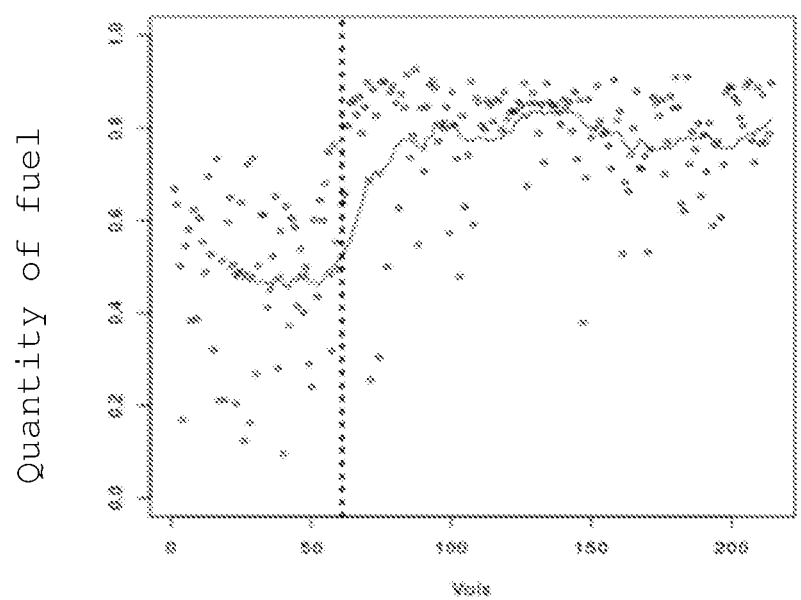
FIG. 4 is a graph showing the evolution, as a function of the number of operating cycles, of the third coefficient of determination established between the first operating parameter of one of the two redundant equipments and a third parameter influencing the operation of the equipment, before and after replacement of the equipment, for the specific embodiment of several flights of an aircraft, the first parameter being the electric current consumed by a fuel booster pump, the third being the mean quantity of fuel measured in the main tank.

In the example of fuel booster pumps of an aircraft, for a value of constant "b" less than or equal to "3" (FIG. 2), a second coefficient of determination is determined, for one or several flights, between the electrical current consumption measurements of one of the fuel booster pumps with the quantity of kerosene in a surge tank and a third coefficient of determination determined between the electrical current consumption measurements of the considered fuel booster pump with the quantity of kerosene in the main tank. If the second coefficient of determination is greater than or equal to 0.7 and the third coefficient of determination is greater than or equal to 0.6, then the fuel booster pump for which these determinations have been made does not suffer from a malfunction. Otherwise, the pump in question is faulty and a malfunction notice is emitted (FIGS. 3 and 4).

If the absolute value of the constant "b", of the regression line established for the first operating parameter of the first equipment and that of the second equipment, for an operating cycle, or part of this cycle, or of other cycles, or parts of operating cycles, is greater than the determined value, this does not mean that one of the two redundant equipments is defective. Indeed, the two redundant equipments can have an asymmetrical, or offset, operation, without being subject to a malfunction. To evaluate this, the method comprises a step for evaluating the "noise" of the redundant equipment(s). To that end, the variations of measurements of the first parameter are determined and compared to a determined mean value, or determined range of limit mean values, for one or several operating cycles in the absence of a malfunction; the noise is then represented by the standard deviations of the first parameter relative to the mean value of the measurements. If one or several standard deviations are greater than the value, or range, determined beforehand for one or several cycles without malfunction of the redundant equipments, then the equipment is considered to be very noisy and suffering from a malfunction; a notification indicating a malfunction of said equipment(s) is then emitted so that maintenance or a replacement is done. If the standard deviations are less than this predetermined value, or value range, then the detection of rising edges, and their number and intensity, is done in the measured values for the first parameter, in order to identify the value peaks, jumps, in the measurements of the first operating parameter. If rising edges exist, the evaluated equipment item is then considered, and indicated by a notification, as experiencing a malfunction, so that maintenance or a replacement is done, whereas if there are no rising edges, the equipment is considered and indicated by an alert as having a normal operation.

Figure 5:
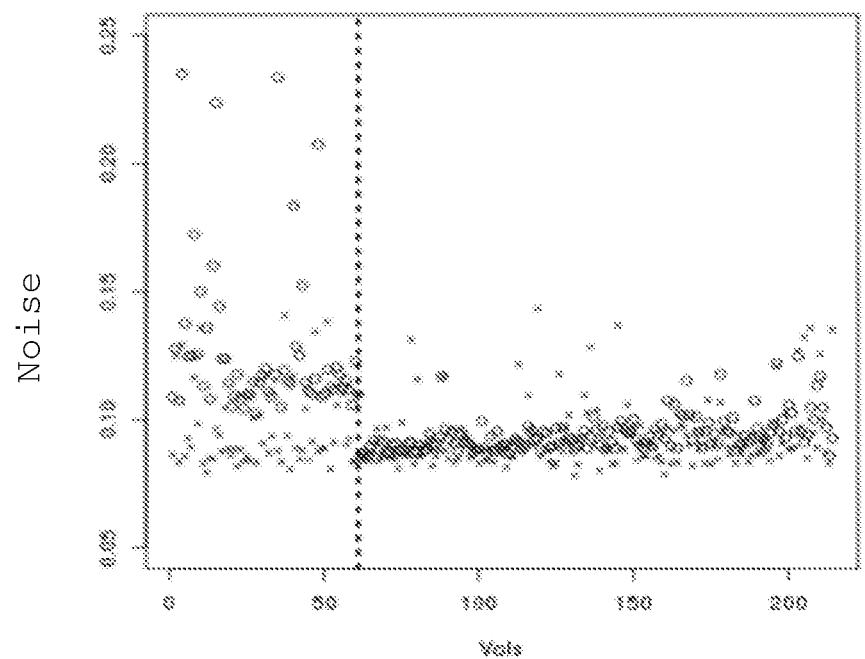
FIG. 5 is a graph showing the evolution, as a function of the number of operating cycles, of the operating noise of one of the two equipments, before and after replacement of the equipment, for the specific embodiment of several flights of an aircraft, the first parameter being the electric current consumed by a fuel booster pump.
Figure 6:
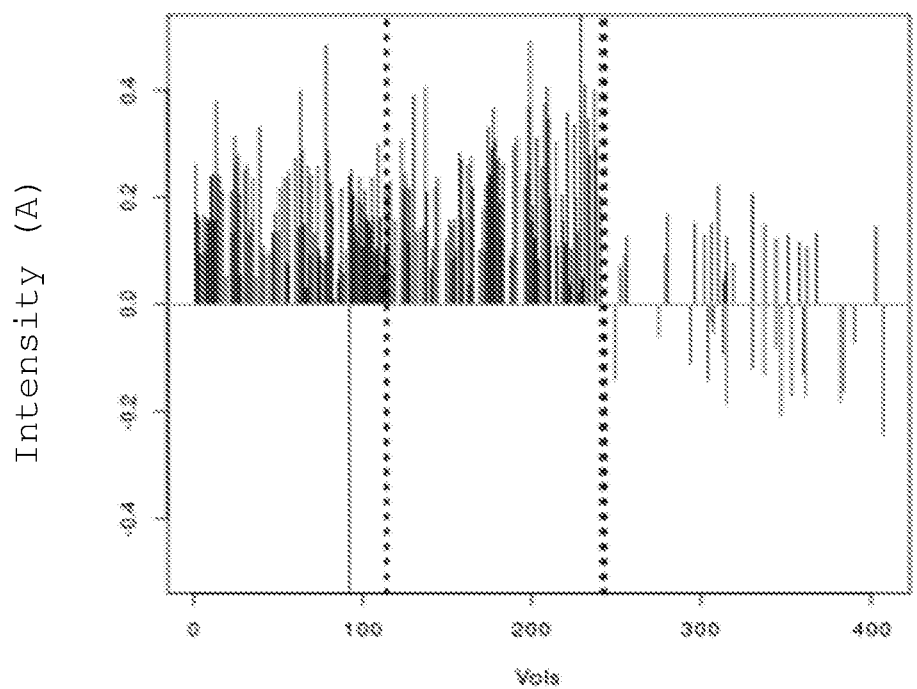
FIG. 6 is a graph showing, as a function of the number of operating cycles, the amplitude of the rising edges of the first operating parameter of one of the two equipments, before and after replacement of the equipment, for the specific embodiment of several flights of an aircraft, the first parameter being the electric current consumed by a fuel booster pump.

In the example of a fuel booster pump of an aircraft, if the value of the constant "b" of the regression line of the first operating parameter of the two redundant equipments for an operating cycle, or cycle parts, or operating cycles or parts of operating cycles, is greater than "3", the operating noise of the evaluated equipment is determined (FIG. 5). If the standard deviation of one or several values of the first operating parameter is greater than or equal to 0.1, then the pump is indicated as being defective. If the latter is between 0.08 and 0.1, without the presence of value peaks, then the pump is operating normally, and will be mentioned as such, whereas in the presence of value peaks, for example intensity peaks of the electrical current greater than 150 mA with an average appearance density over 20 flights greater than 1.6, then the pump is indicated as being defective (FIG. 6).

Preferably, the steps of the method according to the invention will be done sequentially, that is to say, the results of the evaluation of the first coefficient of determination, in particular the sending of the first notification mentioning the malfunction or the absence of malfunction, trigger, or do not trigger, the implementation of the additional steps. However, it may be advantageous to perform each step of the method according to the invention for each cycle of a determined number of operating cycles, and if, for this multitude of operating cycles, for example forty or fifty, the evaluated equipment is considered to be defective in more than half of the cases, then it is considered to need to be replaced, and will be replaced.

Preferably, the evolution of the operating parameter(s) of the redundant equipments over time, in particular of one or several operating cycles or parts of operating cycles and/or the coefficients of determination, optionally also the different thresholds and determined value or mean value, can be shown in graphic form.

The notification(s) can be of any type, visual and/or sound. Preferably, they are intended for third parties needing to decide on and/or perform the maintenance of the assembly comprising the redundant equipments; however, it is also conceivable for the operator(s) of the assembly in question also to be able to have access to or to be the recipient of these notifications.

The method according to the invention is implemented by one or several devices or prediction systems for an operating anomaly of one or several equipments of a stationary or moving assembly, said device(s) or system(s) being or not being an integral part of the stationary or moving assembly, and comprising hardware and/or software means allowing the implementation of all or some of the steps of the inventive method. Preferably, it involves a device or system remote from the assembly in question; it then comprises means for communicating with the assembly of the two redundant devices, and optionally also with the entity having to perform the maintenance of the equipments of the assembly. Preferably, it also comprises means for collecting measurements of the parameter(s) tracked and recorded as well as means for displaying different coefficients of determination, for all or part of one or several operating cycles of the assembly.

The invention claimed is:

1. A method for predicting an operating anomaly of one or more parts of an assembly, the method comprising the following steps:
   taking the assembly, having at least one operating cycle, and comprising one or several series of parts comprising at least a first equipment and a second equipment both operating in parallel, and in substantially the same manner, each equipment comprising a first operating parameter, each operating parameter changing, over time, in a similar manner between the first equipment and the second equipment,
   recording and storing measurements overtime for each operating parameter of the first equipment and the second equipment, one or more operating cycles, or one or more parts of an operating cycle,
   collecting the measurements during or after completion of the one or more operating cycles, or the one or more parts of the operating cycle,
   processing the collected measurements, in order to detect a possible malfunction of the first equipment and/or the second equipment, by establishing a first coefficient of determination, between the measurements of the first operating parameter of the first equipment and the measurements of the first operating parameter of the second equipment,
   in response to the first coefficient of determination being below a first determined threshold for the one or more operating cycles, or the one or more parts of the operating cycle, (i) emitting a notification indicating malfunction of the first equipment and the second equipment and (ii) triggering additional steps, and
   in response to, for the one or more operating cycles, or the one or more parts of the operating cycle, the first coefficient of determination being greater than or equal to the first determined threshold, emitting a notification indicating an absence of malfunction of the first equipment and/or the second equipment and/or adjusting the first determined threshold as a function of the first coefficient of determination.

2. The method according to claim 1, wherein a prior selection of the one or more series of parts comprises the first equipment and the second equipment of the assembly and/or of the first operating parameter of the first equipment or the second equipment.

3. The method according to claim 1, wherein
a second operating parameter corresponds to one of the first equipment, the second equipment, or another part of the assembly,
a third operating parameter corresponds to one of the first equipment, the second equipment, the other part, or a different part of the assembly, and
the method further comprises the following steps:
determining an equation of a linear regression between the first operating parameter of the first equipment and the first operating parameter of the second equipment for the one or more operating cycles, or the one or more parts of the operating cycle, and determining an absolute value of a constant of the equation,
in response to the absolute value being less than or equal to a determined value, establishing, for the first equipment and/or the second equipment, for the one or more operating cycles, or the one or more parts of the operating cycle, a second coefficient of determination between the first operating parameter of one of the first equipment and the second equipment and the second operating parameter, and a third coefficient of determination between the first operating parameter of the one of the first equipment and the second equipment and the third operating parameter,
in response to the second coefficient of determination and the third coefficient of determination being respectively greater than or equal to a second threshold and a third threshold, emitting the notification indicating the absence of malfunction and/or adjusting the second threshold and the third threshold as a function of the second coefficient of determination and the third coefficient of determination,
in response to the absolute value being greater than the determined value, evaluating an operating noise of the first equipment and/or the second equipment,
in response to the operating noise being greater than a determined range of values, emitting the notification indicating malfunction,
in response to the operating noise being within the determined range of values, without a presence of value peaks of the first operating parameter, emitting the notification indicating the absence of malfunction and/or adjusting the determined range of values, and
in response to the operating noise being within the determined range of values, in the presence of the value peaks of the first operating parameter, emitting the notification indicating malfunction.

4. The method according to claim 3, wherein the evaluating of the operating noise of the first equipment and/or the second equipment in response to the absolute value being greater than the determined value is done by determining standard deviations of the measurements of the first operating parameter relative to a mean of the measurements of the first operating parameter over the one or more operating cycles, or the one or more parts of the operating cycle, and by comparing the standard deviations to a determined range of limit mean values.

5. The method according to claim 4, wherein the determined range of limit mean values of the standard deviations of the measurements of the first operating parameter is determined during one or more previous operating cycles, or one or more parts of a previous operating cycle, in which no malfunction of the first equipment and/or the second equipment has been detected.

6. The method according to claim 3, wherein
the second operating parameter and the third operating parameter are chosen from among other operating parameters of the first equipment and the second equipment, different from the first operating parameter, and
one or several of the other operating parameters directly influence (i) operation of the first equipment and/or the second equipment, (ii) one or several operating parameters of the one or several other parts of the assembly different from the first equipment and the second equipment, or (iii) a combination of (i) and (ii).

7. The method according to claim 3, wherein the second threshold of the second coefficient of determination and/or the third threshold of the third coefficient of determination and/or the absolute value of the constant of the equation of the linear regression, is or are determined during one or more previous operating cycles, or one or more parts of a previous operating cycle, in which no malfunction of the first equipment and/or the second equipment has been detected.

8. The method according to claim 3, further comprising one or several graphic representations, as a function of the one or more operating cycles, or the one or more parts of the operating cycle, of the measurements of the first operating parameter of the first equipment and/or the second equipment and/or the first coefficient of determination, or the first operating parameter, of the first coefficient of determination and the second operating parameter and/or the third operating parameter and/or the first coefficient of determination and/or the second coefficient of determination and/or the third coefficient of determination and/or the value peaks in the measurements of the first operating parameter.

9. The method according to claim 1, wherein the first determined threshold of the first coefficient of determination is determined during one or more previous operating cycles, or one or more parts of a previous operating cycle, in which no malfunction of the first equipment and/or the second equipment has been detected.

10. The method according to claim 1, wherein the assembly is one of an aircraft, a car, a bus, a truck, a locomotive, a boat, a ship or a spacecraft, and the first equipment and the second equipment are rotary machines.

11. The method according to claim 10, wherein the assembly is an aircraft, the first equipment and the second equipment are fuel booster pumps of one or several engines, the first operating parameter of the fuel booster pumps is an electric current consumed by each fuel booster pump, a second operating parameter is a mean quantity of fuel measured in a surge tank, and a third operating parameter is a mean quantity of fuel measured in a main tank.

12. A maintenance method of an assembly, comprising one or several series of parts comprising at least a first equipment and a second equipment, both operating in parallel and substantially in the same manner, the method implementing the method according to claim 1.

13. The method according to claim 1, further comprising:
determining an equation of a linear regression between the first operating parameter of the first equipment and the first operating parameter of the second equipment for the one or more operating cycles, or the one or more parts of the operating cycle, and determining an absolute value of a constant of the equation, and executing additional steps based on a comparison between the absolute value and a determined value.

* * * * *